US007352471B2

(12) United States Patent
Truncale

(10) Patent No.: US 7,352,471 B2
(45) Date of Patent: Apr. 1, 2008

(54) EMBEDDED INTERFEROMETRIC FIBER OPTIC GYROSCOPE SYSTEMS AND METHODS

(75) Inventor: Angelo Truncale, Lake Forest, CA (US)

(73) Assignee: The Boeing Company, Chicago, IL (US)

( * ) Notice: Subject to any disclaimer, the term of this patent is extended or adjusted under 35 U.S.C. 154(b) by 262 days.

(21) Appl. No.: 11/225,580

(22) Filed: Sep. 13, 2005

(65) Prior Publication Data

US 2008/0018902 A1 Jan. 24, 2008

(51) Int. Cl.
*G01C 19/72* (2006.01)

(52) U.S. Cl. ...................................... 356/465; 356/460

(58) Field of Classification Search ................ 356/460, 356/465
See application file for complete search history.

(56) References Cited

U.S. PATENT DOCUMENTS

| | | | | |
|---|---|---|---|---|
| 5,552,887 | A * | 9/1996 | Dyott | 356/465 |
| 6,522,826 | B2 * | 2/2003 | Gregory | 385/135 |
| 6,587,205 | B2 * | 7/2003 | Goldner et al. | 356/465 |
| 7,057,734 | B2 * | 6/2006 | Jacobs et al. | 356/460 |
| 2006/0011777 | A1 * | 1/2006 | Arlton et al. | 244/7 B |

* cited by examiner

*Primary Examiner*—Gregory J. Toatley, Jr.
*Assistant Examiner*—Scott M Richey
(74) *Attorney, Agent, or Firm*—MacPherson Kwok Chen & Heid LLP; Greg J. Michelson

(57) ABSTRACT

In accordance with at least one embodiment of the present invention, a system includes a gyroscope and a flight vehicle operatively connected to the gyroscope. The gyroscope includes a length of fiber optic cable arranged in loop and configured to surround an interior loop region. The gyroscope further includes a control unit configured to send and receive light through the fiber optic cable and measure a rate of rotation of the gyroscope. A portion of the flight vehicle is located within the interior loop region.

20 Claims, 3 Drawing Sheets

400
404
414
412
418
410
408
406
416
402

EMBEDDED INTERFEROMETRIC FIBER OPTIC GYROSCOPE SYSTEMS AND METHODS

TECHNICAL FIELD

The present invention relates generally to flight guidance systems, and more particularly to a guidance system including an embedded interferometric fiber optic gyroscope.

RELATED ART

Many flight vehicles, such as aircraft, missiles, and spacecraft, include a number of instruments and components that are each packaged in a housing or enclosure. For some instruments, there is a relationship between the size of the instrument and accuracy so that a larger instrument may be more accurate than a smaller instrument. Because of size and weight budgets, a system designer typically performs a trade-off analysis between the size of such an instrument and the accuracy available in view of the size or weight constraints. Due to these limitations, some instrument technologies may not be used in some flight applications. Hence, there remains a need in the art for systems and methods that allow larger instruments to be used in guidance systems while satisfying size and weight requirements.

SUMMARY

Systems and methods are disclosed herein, in accordance with one or more embodiments of the present invention, to provide an improved fiber optic gyroscope having increased accuracy while conserving space and weight in a flight vehicle such as a missile, an aircraft, or a spacecraft. More specifically, in accordance with an embodiment of the present invention, a system includes a gyroscope and a flight vehicle operatively connected to the gyroscope. The gyroscope includes a length of fiber optic cable arranged in loop and configured to surround an interior loop region. The gyroscope further includes a control unit configured to send and receive light through the fiber optic cable and measure a rate of rotation of the gyroscope. A portion of the flight vehicle is disposed within the interior loop region.

In accordance with another embodiment of the present invention, a system includes a frame configured to support a plurality of system components and a fiber optic gyroscope mounted on the frame. The gyroscope includes a fiber optic cable and a control unit. The fiber optic cable is arranged in a loop to form an interior loop region that is disposed around a portion of the frame to provide physical support for the fiber optic cable. The control unit is coupled to the fiber optic cable and is configured to send and receive light through the fiber optic cable and determine a rate of rotation of the gyroscope.

In accordance with yet another embodiment of the present invention, a method of manufacturing a system with an embedded fiber optic gyroscope, where the system includes a frame for supporting a plurality of components including the fiber optic gyroscope, includes forming a fiber optic cable into a loop having an interior loop region and placing the interior loop region over a portion of the frame.

The scope of the present invention is defined by the claims, which are incorporated into this section by reference. A more complete understanding of embodiments of the present invention will be afforded to those skilled in the art, as well as a realization of additional advantages thereof, by a consideration of the following detailed description. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
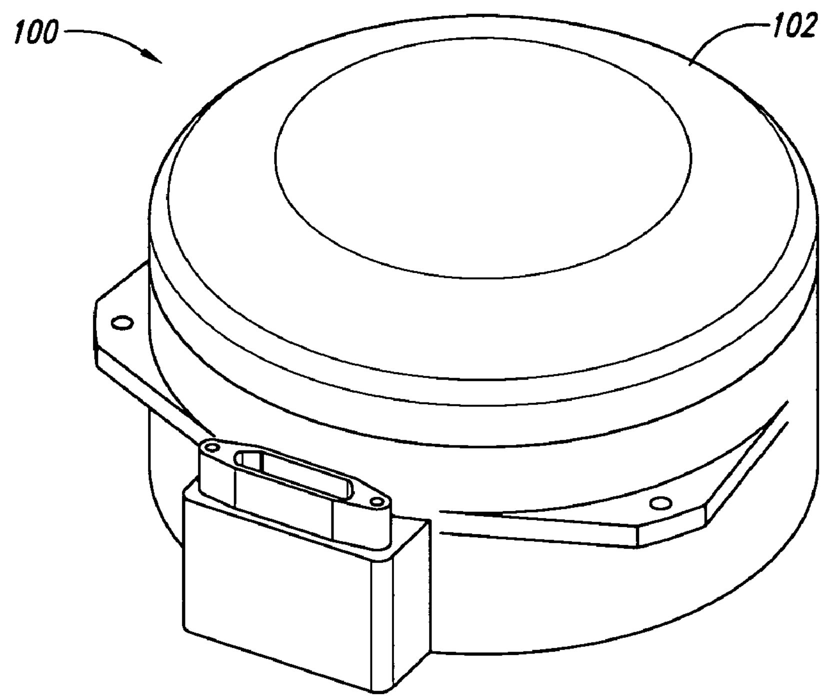
FIG. 1 shows an exterior view of a conventional fiber optic gyroscope.

In accordance with one or more embodiments of the present invention, improved fiber optic gyroscopes and methods of manufacture are disclosed which may provide increased accuracy in a more space efficient manner. For example, the systems and methods may be applied to a missile system where a fiber optic gyroscope is used in an application where use of a conventional fiber optic gyroscope may not be possible. The systems and methods described herein may also be effective in reducing the size and weight of a flight vehicle.

Many flight vehicles, such as aircraft, missiles, and spacecraft, employ an inertial guidance system (IGS) to determine the position and altitude of the vehicle by measuring the accelerations and rotations experienced by the vehicle. The inertial guidance system can compare the actual position and altitude of the vehicle with an expected position and altitude and activate flight control mechanisms in order to effect corrections.

In order to measure rotation, an IGS typically uses a gyroscope instrument that can include mechanical, optical, or a combination of mechanical and optical technologies. A mechanical gyroscope relies on the gyroscopic effect wherein a rotating body (e.g. a rotor) tends to resist a change of its orientation due to inertia. Measurement of a frame around the rotating body can show a change in angular position or rotation of the mechanical gyroscope. On the other hand, an optical gyroscope may have no moving parts, but may instead rely on a measurement of light beams traveling within a fiber optic cable.

Interferometric Fiber Optic Gyroscopes (IFOGs) typically include a loop of optical fiber that is often several kilometers long and is arranged in a loop or coil that is several centimeters in diameter. For an IFOG affixed to a flight vehicle, light travels within the optical fiber in both a clockwise and counterclockwise direction around the loop. If the loop is rotated about an axis perpendicular to the loop plane due to the vehicle rotation, the loop distance traveled by the light in one direction will be shorter than the distance traveled by the light in the other direction, so that when the two light beams meet, there is a phase shift between the two beams. This phase shift is proportional to the rate of rotation of the loop about the axis, and is called the Sagnac Effect (SE). Measurement of the phase change in this manner comprises the use of interferometric techniques. In equation form, the phase shift ($\phi s$) caused by the angular rotation rate is described by $$\phi s = 2\pi L D \Omega_p / \lambda C \quad \text{Equation-1}$$

where L is the length of the optical fiber, D is the average diameter of the fiber optic cable loops, $\Omega_p$ is the angular precession or actual rate of rotation, $\lambda$ is the wavelength of the light, and C is the speed of light. By measuring the phase shift $\phi s$, one can determine the rotation rate of the vehicle in terms of the inertial frame of reference. Typically, the IGS includes instruments such as accelerometers and gyroscopes to measure acceleration and rotation.

IFOG manufacturers typically deliver a fully tested instrument surrounded by a housing designed to protect the IFOG from physical shock, vibration, temperature extremes, and radiation including electromagnetic and electrostatic fields. However, since the instrument is encased in a separate housing, a larger instrument having better performance requires an even larger case that can add significant weight to the flight vehicle. These constraints may make an instrument such as a larger IFOG undesirable or impractical for use in some applications.

Figure 2:
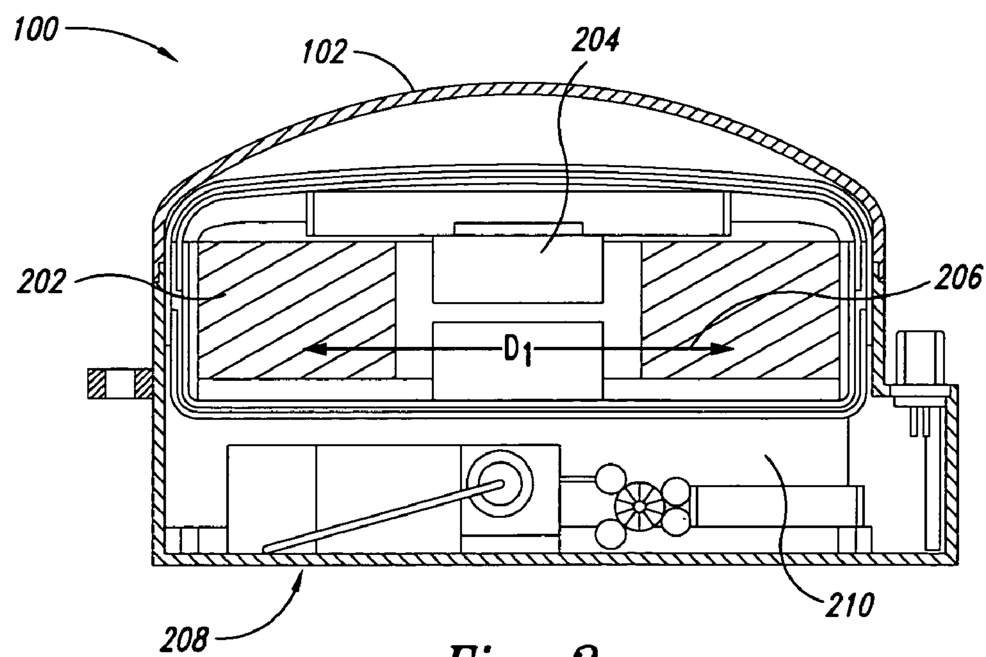
FIG. 2 shows a cutaway side view of the conventional, fiber optic gyroscope of FIG. 1.

For example, FIG. 1 shows an exterior view of a conventional fiber optic gyroscope 100 surrounded by a protective housing 102. FIG. 2 shows a cutaway side view showing a cross-section of fiber optic gyroscope 100 including a fiber optic cable 202 arranged in a loop that has an average loop diameter $D_1$ 206 surrounding an interior loop region 204. Gyroscope 100 includes a control unit 208 that is located in a cavity 210 where cavity 210 is separated from the interior loop region 204 and the space occupied by the cable 202. Control unit 208 includes optical and electronic components used to generate and sense light that is provided to and received from the fiber optic cable 202 in order to measure rotation.

Figure 3:
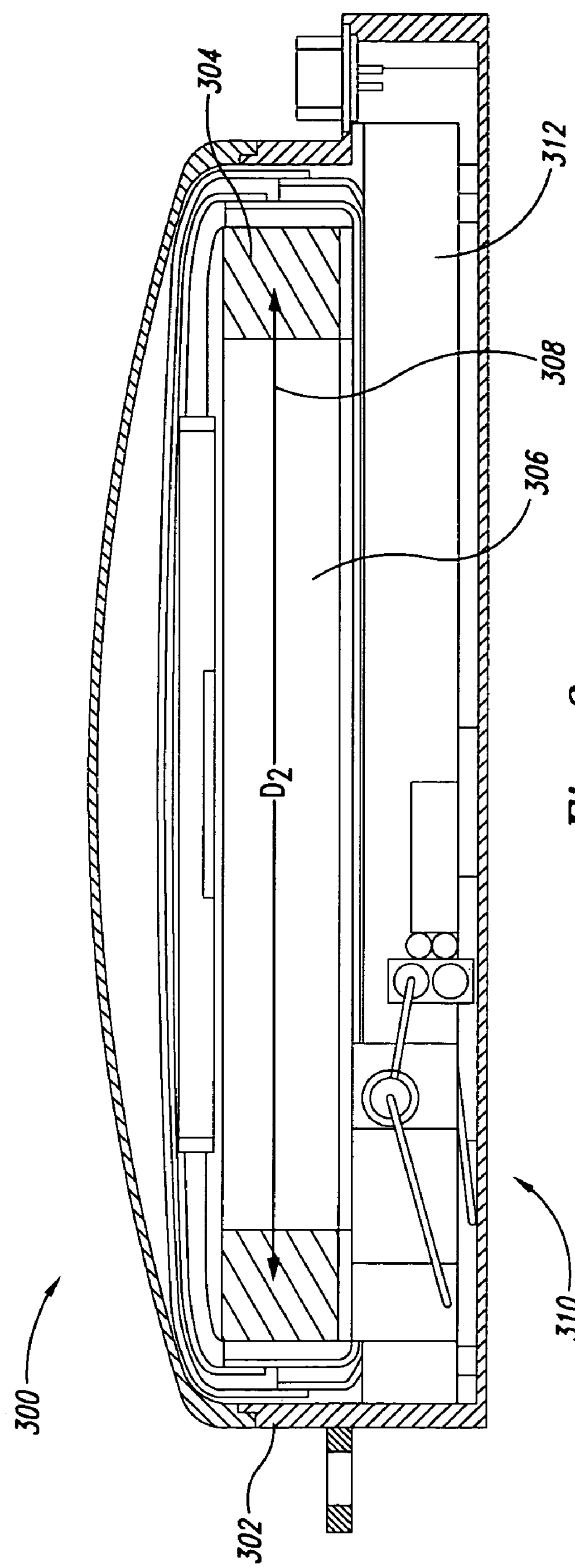
FIG. 3 shows a cutaway side view of a conventional fiber optic gyroscope having a larger fiber optic loop diameter compared to the smaller fiber optic gyroscope of FIG. 1.

In another example, FIG. 3 shows a cutaway side view of a larger conventional fiber optic gyroscope 300 surrounded by a protective housing 302. In this case, gyroscope 300 is more accurate since it has a larger loop diameter compared with fiber optic gyroscope 100. Gyroscope 300 includes a fiber optic cable 304 arranged in a loop surrounding an interior loop region 306 and having an average diameter $D_2$ 308, where $D_2$ is larger than $D_1$ (FIG. 2). Similar to gyroscope 100, gyroscope 300 includes a control unit 310 located in a cavity 312 that is separate from the interior loop region 306 and the space occupied by fiber optic cable 304. Control unit 310 includes optical and electronic components used to generate and sense light that is provided to and received from the fiber optic cable 304 in order to measure rotation.

As can be seen from Equation-1, the measured phase shift $\phi s$ for a given rotation increases as the length of the fiber optic cable and the average diameter of the fiber optic cable loop are increased. The increased phase shift for a given amount of rotation confers an increase in the ability of the gyroscope to accurately measure rotation. Stated differently, the increased phase shift for a given amount of rotation provides an increased sensitivity in the rotation measurement. In this manner, the length of the fiber optic cable and the average diameter of the fiber optic cable loop directly affect the accuracy of the final IFOG instrument, so that a larger diameter and/or longer length fiber optic cable can result in greater accuracy. However, gyroscope noise is a function of the length of the fiber optic cable. In order to keep the noise levels to an acceptable level, it is desirable to limit the length of the fiber optic cable to less than a predetermined length. Due to this limitation in cable length, one may try to increase the average diameter of the fiber optic cable loop in order to achieve the desired accuracy.

However, an optical gyroscope having both acceptable accuracy and an acceptable noise level may become prohibitively large or heavy due to the conventional housing surrounding the fiber optic cable loop. While using an IFOG in a flight vehicle is desirable because the IFOG does not contain moving parts and thus may provide a higher reliability, the higher accuracy requirements for some flight systems results in an increase in size and weight of the housing that can exceed the size and weight budget for the proposed system. Hence, a conventional IFOG cannot be selected for these applications.

Figure 4:
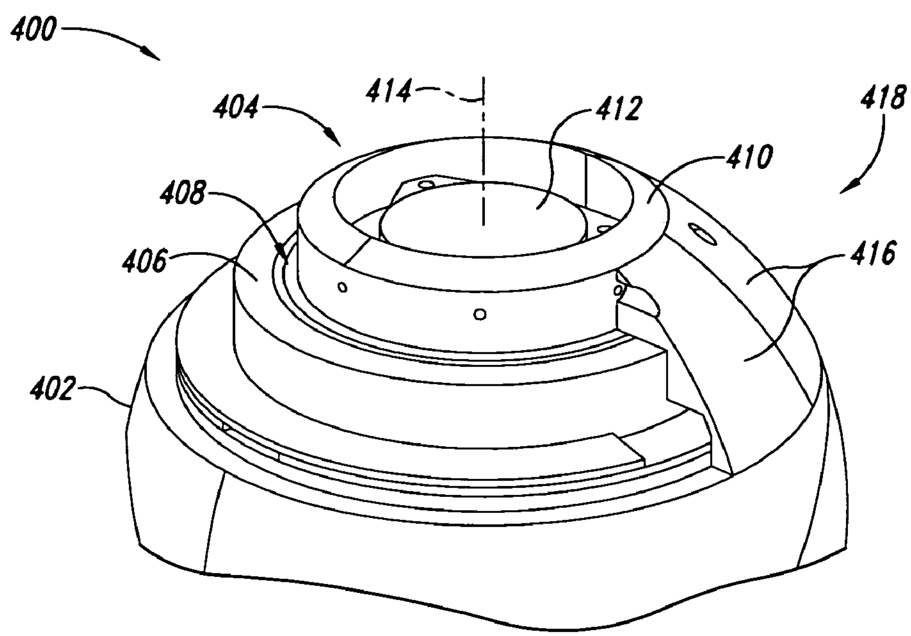
FIG. 4 shows a flight vehicle with an embedded fiber optic gyroscope, in accordance with an embodiment of the present invention.

In reference to FIG. 4, according to an embodiment of the present invention, a system 400 (e.g. a flight vehicle such as a missile, a rocket, a spacecraft, an aircraft, or a satellite) includes a flight vehicle frame 402 and an embedded interferometric fiber optic gyroscope (IFOG) 404 affixed to vehicle frame 402. Furthermore, in accordance with an embodiment of the present invention, IFOG 404 may be employed in any type of system requiring gyroscopic functionality. IFOG 404 includes a length of fiber optic cable 406 formed in a loop that surrounds an interior loop region 408. Because IFOG 404 does not include a separate housing, a portion of flight vehicle 400, such as for example a portion of frame 402, can be located within the interior loop region 408.

Frame 402 comprises the structural support members for system 400 such as a cage, shell, or body forming the internal structure of a flight vehicle. Frame 402 can include a guidance system instrument mount 410 affixed to frame 402 for supporting one or more guidance system components, where the loop of cable 406 is located around a portion of mount 410. In this manner, mount 410 provides structural support for fiber optic cable 406 and the space defined by interior region 408 is effectively utilized. Other components, instruments, or portions of system 400 may be located within interior region 408 as long as these elements do not interfere with the proper operation of IFOG 404.

A control unit 412 includes optical and electronic components to send and receive light through fiber optic cable 406 and measure a rate of rotation of the gyroscope when the flight vehicle rotates on an axis 414 that is perpendicular to a plane described by the loops of cable 406. Control unit 412 or other system components may be located partially or fully within interior loop region 408 or may be located at a separate location. In this example, the loops of cable 406 are located symmetrically about axis 414. Although such a symmetrical location is preferable for precisely measuring rotation, in either a clockwise or counterclockwise direction, about axis 414, such a symmetrical location is not necessary. In this example, instrument mount 410 is cylindrical and is formed around a central instrument mount axis 414. Similarly, fiber optic cable 406 has a central loop axis that is mounted coaxially with central instrument mount axis 414. A plurality of securing members 416 or covers may be used to provide physical support as well as providing any of thermal, magnetic, or electrostatic shielding to the internal instruments so that a separate housing for IFOG 404 and possibly other components is not necessary. Securing members 416 may be attached to frame 402 or mount 410 using any acceptable method of attachment including the application of screws for a removable attachment, or welding for a permanent attachment. Securing members 416 form a portion of an external vehicle housing 418 that may be used to provide physical support and shielding to interior components supported by frame 402, as described. Alternatively, strapping members (not shown) may be used to secure at least a portion of IFOG 404 to frame 402 in a strap-down manner.

Thus, because manufacturers of flight instruments typically deliver fully tested units that are protected by an external unit housing, by embedding a portion of an instrument such as IFOG 404 within a system 400, the volume and weight of a traditional IFOG housing can be eliminated. Stated differently, the components that comprise an Interferometric Fiber Optic Gyroscope (IFOG), namely fiber optic cable 406 arranged in a loop and control unit 412, are mounted directly to the guidance system instrument mount 410, thereby eliminating the large and heavy case that generally hold these components comprising a conventional IFOG. This mounting configuration reduces the volume of the instrument and permits the space inside fiber optic cable 406 to be efficiently utilized.

According to yet another embodiment, a method of manufacturing a system 400 with an embedded fiber optic gyroscope 404, includes forming a length of fiber optic cable 406 into a loop having an interior loop region 408 and placing interior loop region 408 over a portion of frame 402 to embed the fiber optic gyroscope 404 within system 400. Interior loop region 408 may be placed around guidance system mount 410, or other portion of frame 402 for example, so that the space defined by interior loop region 408 is at least partially filled resulting in a more compact implementation. The method may further include positioning a portion of system 400 or at least a portion of control unit 412 within interior loop region 408. Finally, the method may further include securing cable 406 to a portion of frame 402 using a plurality of securing members 416. The method of manufacture can include a method of testing where interior loop region 408 is placed over a portion of a test frame that is similar to guidance system mount 410, where the test frame is rotated alternately in a first direction and a second direction about axis 414 to exercise the rotational measurement capabilities of IFOG 404.

Figure 5:
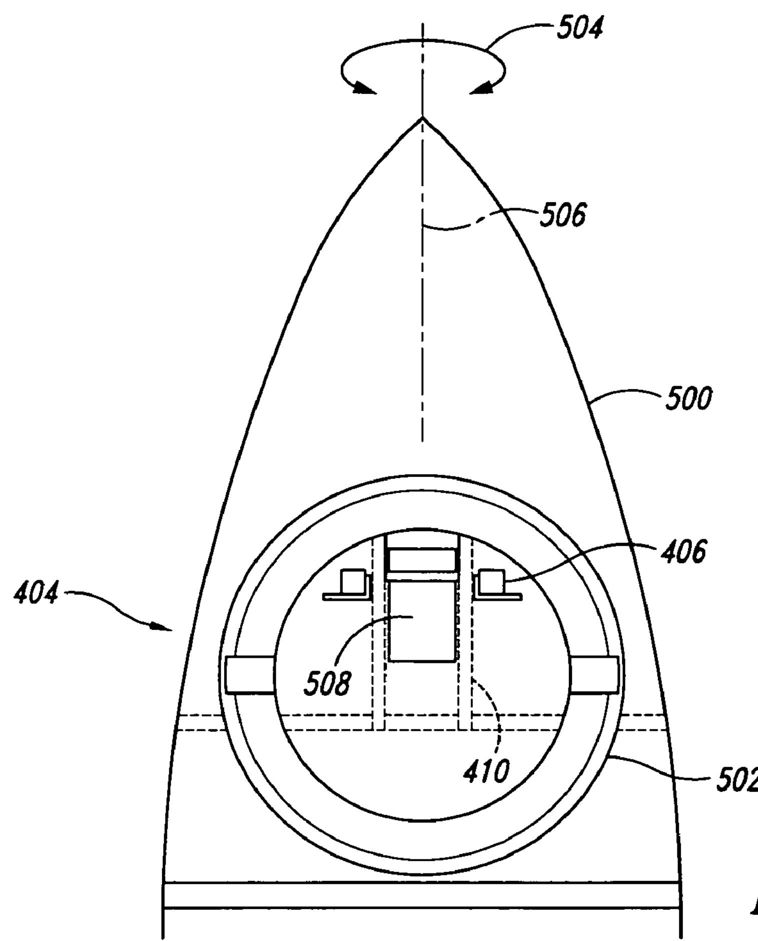
FIG. 5 shows a side view cutaway portion of a missile system with a fiber optic gyroscope embedded within a guidance system, in accordance with an embodiment of the present invention.

FIG. 5 shows a side view cutaway portion of a missile system 500 with an IFOG 404 embedded within a guidance system 502 that is capable of measuring roll 504 of missile system 500 in clockwise or counterclockwise direction around a longitudinal axis 506. Optical cable 406 is shown mounted around a portion of guidance system mount 410 while another guidance system component 508 independent of IFOG 404 is shown mounted within guidance system mount 410.

Although embodiments are shown including an interferometric fiber optic gyroscope, other types of instruments comprising a length of optical fiber cable arranged in a loop may be used where at least a portion of the space within a fiber optic interior loop region is occupied as described. It should be understood that numerous modifications and variations are possible in accordance with the principles of the present invention. Accordingly, the scope of the invention is defined only by the following claims.

I claim:

1. A system, comprising:

a gyroscope comprising:

a length of fiber optic cable arranged in a loop and configured to surround an interior loop region; and a control unit configured to send and receive light through the fiber optic cable and determine a rate of rotation of the gyroscope; and a flight vehicle operatively coupled to the gyroscope, wherein a portion of the flight vehicle is disposed within the interior loop region.

2. The system of claim 1, wherein the portion of the flight vehicle disposed within the interior loop region is a guidance system instrument mount.

3. The system of claim 1, wherein a portion of the control unit is disposed within the interior loop region.

4. The system claim 3, wherein the control unit utilizes interferometric techniques.

5. The system of claim 1, further comprising a plurality of securing members configured to secure the fiber optic cable to the flight vehicle.

6. The system of claim 1, wherein disposing the portion of the flight vehicle within the interior loop region does not interfere with the proper operation of the gyroscope.

7. The system of claim 1, wherein the flight vehicle is at least one of a missile, a rocket, an aircraft, a satellite, and a spacecraft.

8. A system, comprising:

a frame of a flight vehicle configured to support a plurality of system components; and a fiber optic gyroscope mounted on the frame and operatively coupled to the flight vehicle, the gyroscope comprising a fiber optic cable arranged in a loop and forming an interior loop region disposed around a portion of the frame to provide physical support for the fiber optic cable; and a control unit coupled to the fiber optic cable, the control unit being configured to send and receive light through the fiber optic cable and determine a rate of rotation of the gyroscope.

9. The system of claim 8, wherein the portion of the frame that provides physical support to the fiber optic cable includes an instrument mount.

10. The system of claim 9, further comprising a plurality of securing members configured to secure the fiber optic cable to the frame.

11. The system of claim 10, wherein the securing members form a portion of an external vehicle housing.

12. The system of claim 11, wherein the securing members are configured to provide at least one of thermal shielding, electromagnetic shielding, and electrostatic shielding.

13. The system of claim 10, wherein the instrument mount is cylindrical and has a central instrument mount axis.

14. The system of claim 13, wherein the fiber optic cable loop has a central loop axis mounted coaxially with the central instrument mount axis.

15. The system of claim 8, wherein the flight vehicle comprises at least one of a missile, a rocket, an aircraft, a satellite, and a spacecraft.

16. A method of manufacturing a system with an embedded fiber optic gyroscope, the system including a frame of a flight vehicle for supporting a plurality of components including the fiber optic gyroscope, the method comprising:

forming a fiber optic cable into a loop having an interior loop region;

placing the interior loop region over a portion of the frame;

configuring a control unit to send and receive light through the fiber optic cable to determine a rate of rotation; and coupling the control unit operatively to the flight vehicle.

17. The method of claim 16, further comprising securing the fiber optic cable to the portion of the frame using a plurality of securing members.

18. The method of claim 17, wherein the securing members provide at least one of thermal shielding, electromagnetic shielding, and electrostatic shielding for the gyroscope.

19. The method of claim 16, wherein the method of manufacture further comprises testing the gyroscope.

20. The method of claim 16, wherein the flight vehicle comprises at least one of a missile, a rocket, an aircraft, a satellite, and a spacecraft.

* * * * *